US007005029B2

(12) United States Patent
Khan et al.

(10) Patent No.: US 7,005,029 B2
(45) Date of Patent: Feb. 28, 2006

(54) METHOD OF MAKING A MULTI-WELL TEST PLATE HAVING ADHESIVELY SECURED TRANSPARENT BOTTOM PANEL

(75) Inventors: Abdul Wahid Khan, Naperville, IL (US); Wendy Kay Scholz, Naperville, IL (US); Erika Lynn Tracy, Glendale Heights, IL (US); Margaret Maria Kelly, Aurora, IL (US)

(73) Assignee: Nalge Nunc International Corporation, Rochester, NY (US)

( * ) Notice: Subject to any disclaimer, the term of this patent is extended or adjusted under 35 U.S.C. 154(b) by 232 days.

(21) Appl. No.: 10/629,053

(22) Filed: Jul. 29, 2003

(65) Prior Publication Data
US 2004/0020595 A1 Feb. 5, 2004

Related U.S. Application Data

(62) Division of application No. 09/427,235, filed on Oct. 26, 1999, now abandoned.

(51) Int. Cl.
*C12M 1/00* (2006.01)
(52) U.S. Cl. .............................. 156/275.5; 156/275.7; 156/291
(58) Field of Classification Search ............ 156/272.2, 156/275.5, 275.7, 291; 422/40, 102; 435/305.1, 435/305.2, 305.3, 305.4
See application file for complete search history.

(56) References Cited

U.S. PATENT DOCUMENTS

| | | | |
|---|---|---|---|
| 3,745,091 A | 7/1973 | McCormick | 195/139 |
| 4,004,150 A | 1/1977 | Natelson | 250/328 |
| 4,076,550 A | 2/1978 | Thurn et al. | 106/288 |
| 4,154,795 A | 5/1979 | Thorne | 422/99 |
| 4,251,159 A | 2/1981 | White | 356/246 |
| 4,276,259 A | 6/1981 | Eibl et al. | 422/71 |
| 4,284,542 A | 8/1981 | Boyce et al. | 260/27 |
| 4,302,534 A | 11/1981 | Halmann et al. | 435/6 |
| 4,385,115 A | 5/1983 | de Zabala et al. | 435/33 |
| 4,424,067 A | 1/1984 | Tarasenko et al. | 55/16 |
| 4,431,307 A | 2/1984 | Suovaniemi | 356/246 |
| 4,468,371 A | 8/1984 | Chen et al. | 422/102 |
| 4,493,815 A | 1/1985 | Fernwood et al. | 422/101 |
| 4,545,958 A | 10/1985 | Dopatka | 422/102 |
| 4,652,553 A | 3/1987 | Hagmann et al. | 514/26 |
| 4,720,935 A | 1/1988 | Rogers et al. | 47/56 |
| 4,735,778 A | 4/1988 | Maruyama et al. | 422/102 |

(Continued)

FOREIGN PATENT DOCUMENTS

EP 0571661 A1 12/1993

(Continued)

OTHER PUBLICATIONS

Nalge Nunc International, *Evolving Excellence for In Situ Culture & Analysis*, Brochure, undated.

(Continued)

*Primary Examiner*—John T. Haran
(74) *Attorney, Agent, or Firm*—Wood, Herron & Evans, L.L.P.

(57) ABSTRACT

A method of making a multi-well test plate including an upper frame portion and a glass panel secured to a lower side of the upper frame portion with a layer of light-curable adhesive. The upper frame portion includes a plurality of walls defining adjacent wells for receiving assay samples. The adhesive has various properties, such as high viscosity, thixotropicity, transparency, water insolubility, non-autofluorescence, and non-toxicity, as well as others that are advantageous when constructing and using the multi-well test plate. The adhesive is preferably applied by a screen transfer process that takes advantage of the adhesive properties.

27 Claims, 5 Drawing Sheets

U.S. PATENT DOCUMENTS

| | | | |
|---|---|---|---|
| 4,741,619 A | 5/1988 | Humphries et al. | 356/246 |
| 4,770,856 A | 9/1988 | Uthemann et al. | 422/104 |
| 4,828,386 A | 5/1989 | Matkovich et al. | 356/246 |
| 4,871,590 A | 10/1989 | Merz et al. | 427/387 |
| 4,948,442 A | 8/1990 | Manns | 156/73.1 |
| 4,956,150 A | 9/1990 | Henry | 422/102 |
| 4,973,742 A | 11/1990 | Ohsaka et al. | 560/184 |
| 5,043,581 A | 8/1991 | Joss | 250/328 |
| 5,047,215 A | 9/1991 | Manns | 422/101 |
| 5,082,628 A | 1/1992 | Andreotti et al. | 422/82.08 |
| 5,302,515 A | 4/1994 | Goodwin, Jr. | 435/29 |
| 5,319,436 A | 6/1994 | Manns et al. | 356/246 |
| 5,487,872 A | 1/1996 | Hafeman et al. | 422/102 |
| 5,508,197 A | 4/1996 | Hansen et al. | 435/285.1 |
| 5,540,978 A | 7/1996 | Schrenk | 428/212 |
| 5,571,721 A | 11/1996 | Turner | 435/305.1 |
| 5,580,528 A | 12/1996 | Demers | 422/100 |
| 5,736,106 A | 4/1998 | Ishiguro et al. | 422/131 |
| 5,858,309 A | 1/1999 | Mathus et al. | 422/102 |
| 5,858,770 A | 1/1999 | Perlman | 435/305.3 |
| 6,171,780 B1 | 1/2001 | Pham et al. | 435/4 |
| 6,458,275 B1 | 10/2002 | Shukla et al. | 210/321.6 |
| 6,503,456 B1 | 1/2003 | Knebel | 422/102 |
| 6,514,464 B1 | 2/2003 | Knebel | 422/102 |
| 2002/0022219 A1 | 2/2002 | Clements et al. | |
| 2003/0031829 A1 | 2/2003 | Tanner et al. | |

FOREIGN PATENT DOCUMENTS

| | | |
|---|---|---|
| EP | 0723812 A1 | 7/1996 |
| WO | WO 98/42442 | 10/1998 |
| WO | WO 02/40158 A2 | 5/2002 |

OTHER PUBLICATIONS

Nalge Nunc International, *Introducing Lab-Tex II The Next Generation*, Brochure, undated.

Nalge Nunc International, *Lab-Tek II Chambered Coverglass Gear Up for High-Power Inverted Methods..*, Brochure, undated.

Nalge Nunc International, *Nunc™ Products Laboratory Products for Cell Culture, Molecular Biology, Cyropreservation and Immunology*, Catalog, 1998-1999.

METHOD OF MAKING A MULTI-WELL TEST PLATE HAVING ADHESIVELY SECURED TRANSPARENT BOTTOM PANEL

CROSS-REFERENCE TO RELATED APPLICATIONS

This application is a divisional of application Ser. No. 09/427,235, filed Oct. 26, 1999, now abandoned, the disclosure of which is hereby fully incorporated by reference herein.

FIELD OF THE INVENTION

The present invention generally relates to multi-well test plates or so-called micro-plates for assaying liquid samples and, more particularly, to multi-well test plates having glass bottoms secured to a framework of wells for containing the liquid samples.

BACKGROUND OF THE INVENTION

Multi-well test plates are well known in scientific areas, such as biotechnology, for allowing the detection and measurement of substances present in translucent liquid samples. Generally, this is accomplished by measuring the light absorbence characteristics of the sample through one or more spectroscopy procedures. Typically, a framework of test wells is open at the top for receiving the liquid samples and is closed with a transparent bottom, formed of a polymer or glass, for allowing light radiation penetration in a wavelength region necessary for a particular study. These studies, commonly referred to assays, may include drug concentration assays, drug metabolite assays, enzyme activity assays, enzyme cofactor assays, fluorescent probe excitations or emissions, DNA spectral shifts or DNA and protein concentration measurements, as well as many other studies.

Due to the advantageous physical and optical properties of glass, glass bottom test plates can be more desirable than test plates having bottoms formed from a transparent polymer, such as polyolefins, fluoropolymers, polyesters, or other homopolymers and copolymers. The thickness of the transparent bottom has also been recognized as an important factor for achieving accurate test results. Moreover, when applying a glass sheet or panel to the bottom of a polymeric framework, for example, it has been difficult to achieve a seal in surrounding relation to each test well. Manufacturing methods involving an adhesive securement of the glass panel to the test well framework can be very slow and result in inadequate adhesion, inadequate sealing around the bottom of each well, adhesive migration into the test wells or other problems.

The present invention is therefore generally directed to the manufacture of multi-well test plates having an upper frame structure with multiple test wells and a thin, glass or other transparent bottom panel adhered to the framework in a fast and effective manner which does not have any adverse consequences related to the subsequent use of the test plate.

SUMMARY OF THE INVENTION

In one general aspect, the invention provides a multi-well test plate comprising an upper frame portion including a plurality of walls defining adjacent wells, each wall having an upper end and a lower end. The test plate further includes a transparent panel having an upper surface and a lower surface. The transparent panel is secured to the lower ends of the walls defining the wells by a layer of ultraviolet and visible (UV/V) light curable adhesive contacting the upper surface of the glass panel and the lower end of each wall surrounding a corresponding lower end of each well. The use of a UV/V curable adhesive allows the use of UV and visible light directed through the transparent panel to cure the adhesive between the transparent panel and upper frame portion. In the preferred embodiment, the transparent panel is glass; however, other transparent polymers or plastics may be used to form this panel while still realizing various benefits of this invention. The UV/V light curing process does not modify the glass bottom panel of the preferred embodiment in a manner that adversely affects performance.

As other equally important aspects of the invention, an adhesive as contemplated for the invention has various advantageous properties. These properties, singly or in various combinations, serve different functions and may be exhibited by a UV/V curable adhesive as mentioned above, or other heat curable or infrared curable adhesives or epoxies. For example, the adhesive has a viscosity that is preferably greater than about 8,000 cps to minimize flowing for more accurate adhesive placement. The adhesive is also thixotropic in nature in that it will not flow after application, for example, onto the upper surface of the glass panel. This has two beneficial results. First, the adhesive will not flow into an area of the glass panel that will become the bottom surface of a well so as to potentially contaminate the samples within the well. Also, the adhesive will not thin out after application and consequently decrease the adhesion between the glass panel and the upper frame portion.

The adhesive is also preferably transparent and this aspect has been found advantageous for the reason that it will not interfere with detection made from the bottom of the plate, due to specific wavelength absorbance or reflection. Curability by UV and visual light is advantageous because complete cure and nontoxicity is ensured by UV exposure followed by additional exposure to visual light. A one component adhesive as described herein eliminates the need for mixing and its associated problems such as variability in time between mixing and application. The adhesive cures to form a flexible joint to prevent stress cracking during cure and later during use of product at various temperatures. The adhesive is stable during and after ethylene oxide and gamma sterilization. The adhesive is nontoxic and is USP Class VI.

Moreover, the adhesive as used in this invention exhibits no off-gassing after curing. Such off-gassing could result in sample contamination. The adhesive is also water insoluble so as to be unaffected by the liquid samples contained in the test wells. The adhesive is non-autofluorescent so that the use of light during testing procedures or studies does not cause the adhesive to autoflouresce and adversely affect the study. The glass panel preferably has a thickness of about 0.006", as this thickness has been found to be most advantageous in the elimination of so-called cross talk and optimizes other optical properties. A suitable range of thicknesses for the glass panel may be from about 0.005" to about 0.040". Although various adhesives may be used having one or more of the above-mentioned, advantageous properties, the preferred UV/V curable adhesive is an acrylated urethane adhesive or an adhesive with the same physical properties as claimed herein.

Additional objectives, advantages and features of the invention will become more readily apparent to those of ordinary skill in the art upon review of the following detailed description of the preferred embodiments, taken in conjunction with the accompanying drawings.

DETAILED DESCRIPTION OF THE PREFERRED EMBODIMENTS

Figure 1:
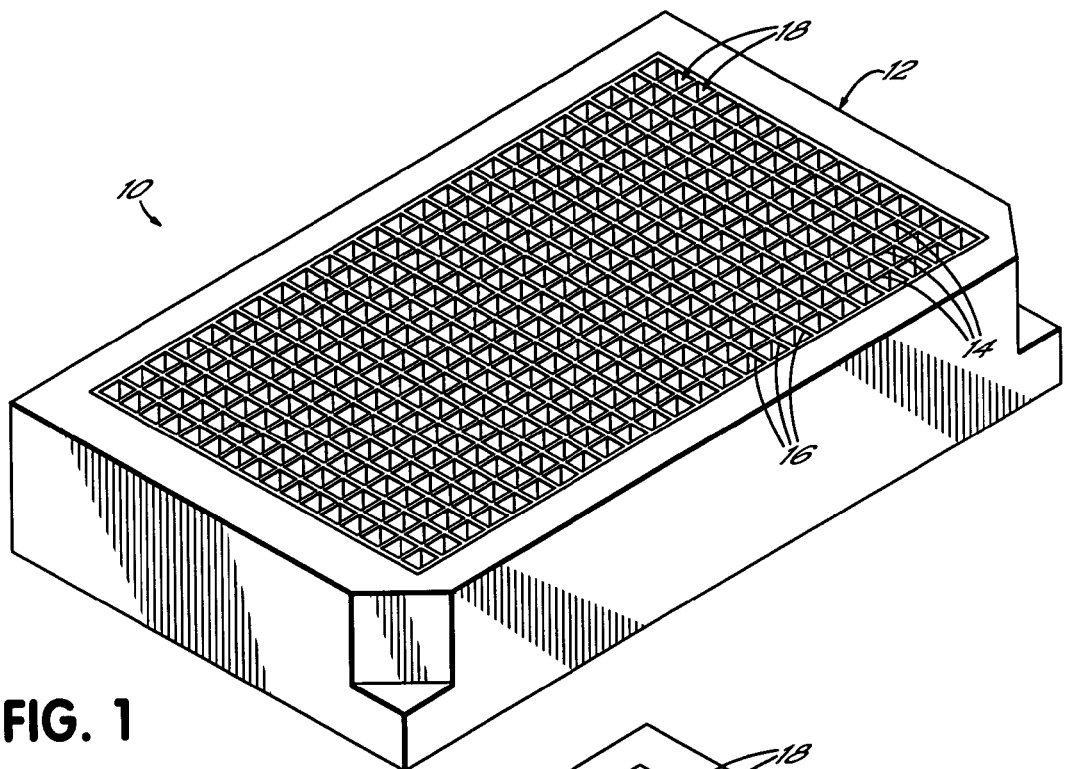
FIG. 1 is a perspective view of a multi-well test plate constructed in accordance with one illustrative and preferred embodiment of the invention.
Figure 2:
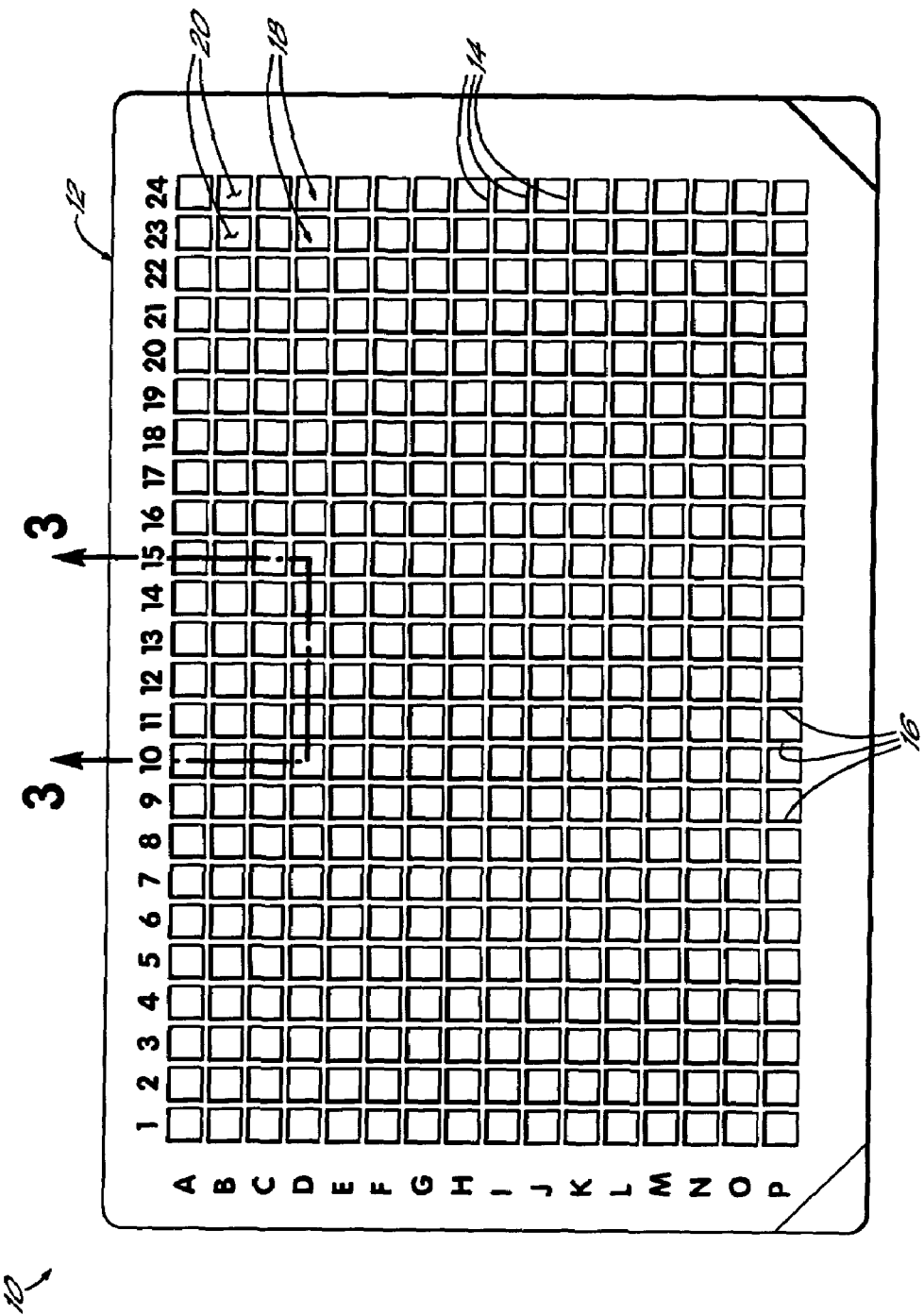
FIG. 2 is a top view of the multi-well test plate shown in FIG. 1.
Figure 3:
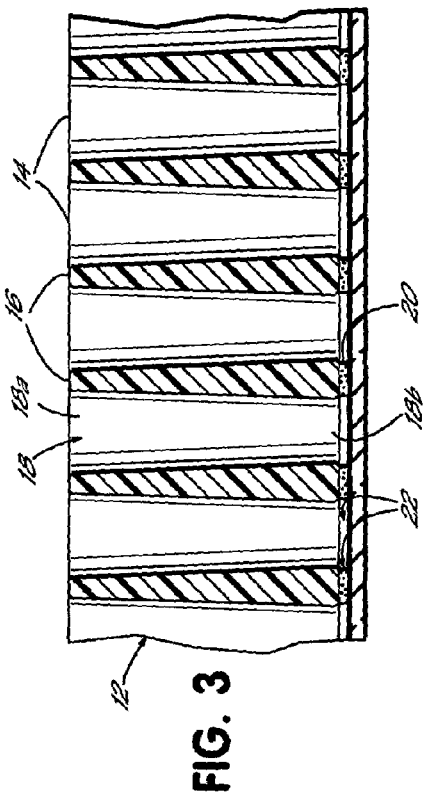
FIG. 3 is a cross-sectional view taken along line 3—3 of FIG. 2.

Referring first to FIGS. 1–3, a multi-well test plate 10 constructed in accordance with one preferred embodiment of the invention generally comprises an upper frame portion 12 having a plurality of intersecting walls 14, 16. Upper frame portion 12 is preferably formed from a polymer, such as polystrene, and is preferably opaque. Depending on the intended use of test plate 10, upper frame portion 12 can be transparent, black or white in color. White has advantageous light reflective properties, while black has advantageous light absorptive properties. Walls 14, 16 form independent wells 18 for receiving liquid assay samples. The specific embodiment shown and described herein includes 384 square wells 18, however, it should be understood that a greater or fewer number of wells may be used in a multi-well test plate constructed in accordance with the inventive concepts. Also, the square wells shown and described herein are also for illustrative purposes and may be substituted with wells of various shapes, including circular wells or other polygonal-shaped wells. As best shown in FIG. 3, upper frame portion 12 is secured to a glass panel 20 by a layer of adhesive 22, as more specifically discussed below. Optionally, glass panel 20 may be substituted with a polymeric transparent panel suitable for the intended use of the product. It is important that the layer of adhesive 22 be positioned in surrounding relation to each well 18 between walls 14, 16 and glass panel 20. This must be accomplished while achieving sufficient adhesion between walls 14, 16 and glass panel 20, but without allowing adhesive to squeeze into wells 18 as glass panel 20 is applied to upper frame portion 12, as further described below.

The preferred adhesive 22 is an acrylated urethane, UV/V light curable adhesive. One preferred adhesive is Loctite® adhesive 3211, which exhibits all of the properties preferred in the present invention. These properties include UV/V light curability, thixotropic characteristics, transparency, no off-gassing after curing, water insolubility, non-autofluorescence, a viscosity greater than about 8,000 centipoise (cps), non-toxicity, the ability to release completely from an application screen and the affinity to transfer completely to a glass surface. Although an exaggerated thickness is shown in FIG. 3 for clarity, adhesive layer 22 is preferably applied in a thickness ranging from about 0.0005" to about 0.005". The preferred adhesive thickness is from about 0.002" to about 0.004". The thickness of glass panel 20 is preferably about 0.006", but may be within a range of thicknesses of about 0.005" to about 0.040". When the adhesive is applied, for example, in a grid pattern as described below, an edgewise gap of about 0.003" to about 0.005" is left on each side of the bottom of each wall 14, 16 so as to accommodate squeeze-out of the adhesive as glass panel 20 is applied to upper frame portion 12.

Figure 5:
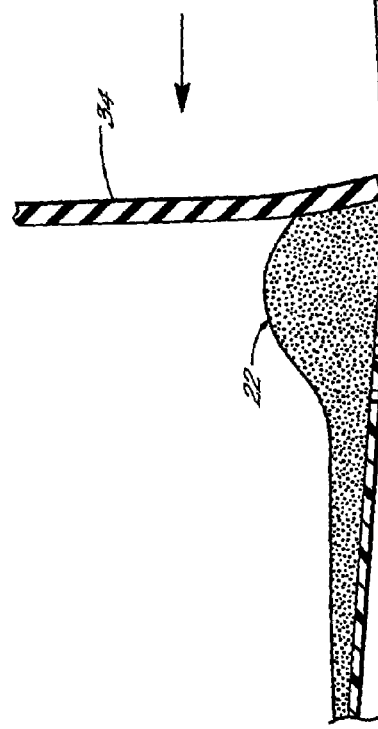
FIG. 5 is a cross-sectional view similar to FIG. 4, but showing the adhesive transfer from the screen to the glass panel.
Figure 4:
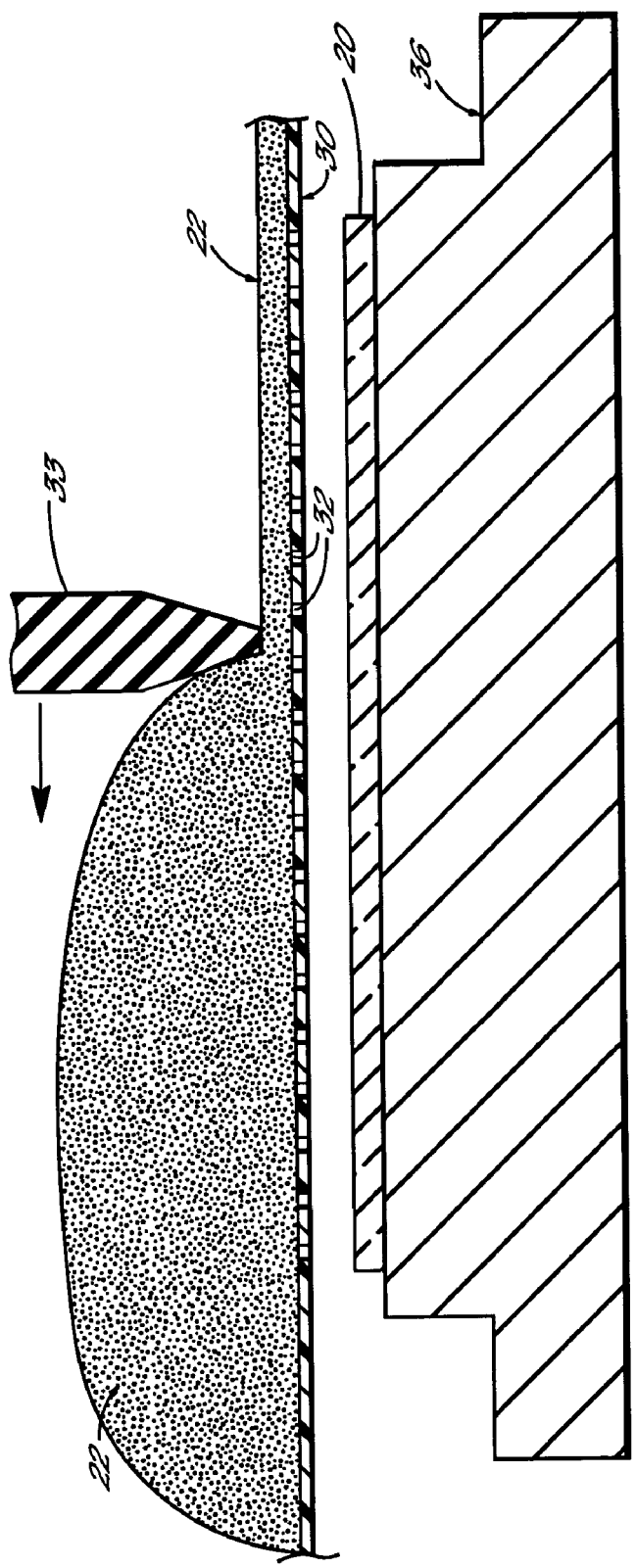
FIG. 4 is a cross-sectional view schematically showing an initial step in a screen transfer process being used to initially apply adhesive to a screen during the manufacture of the test plate shown in FIG. 1.
Figure 6:
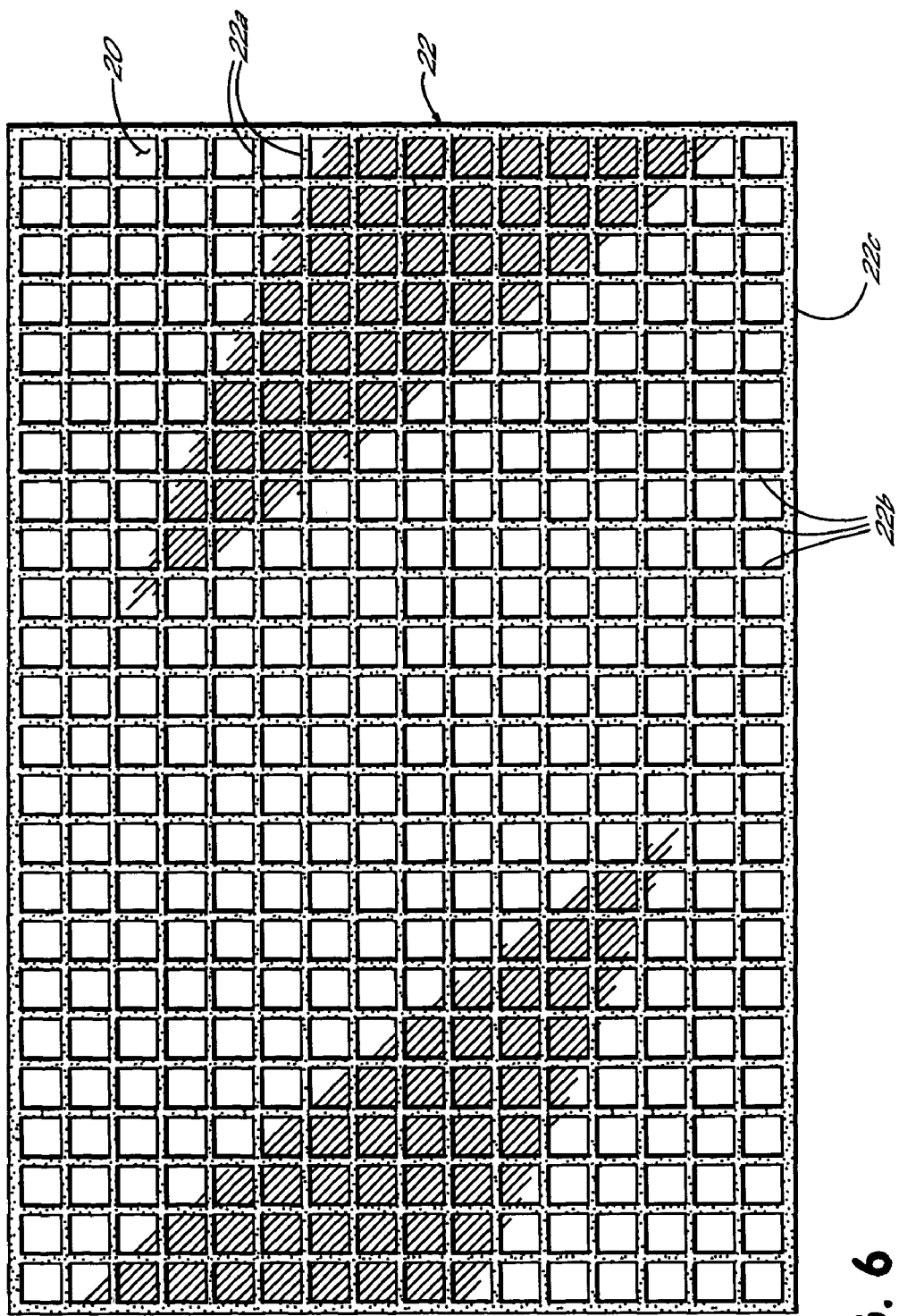
FIG. 6 is a top view of the glass panel after application of the adhesive through the screen as shown in FIG. 5.

Turning now to FIGS. 4–6, a schematic representation of an adhesive application process is shown using a screen 30 having apertures 32 formed into a grid pattern corresponding to the pattern of adhesive necessary to secure frame portion 12 to glass panel 20, as shown in FIG. 3. More specifically, adhesive 22 is initially applied in a generally even layer on screen 30 by a flood bar 33 (FIG. 4) and, in a subsequent step, a squeegee or doctor blade 34 (FIG. 5) is moved across the upper surface of screen 30 so as to force adhesive 22 through apertures 32 and onto the upper surface of glass panel 20. The thickness of adhesive layer 22 produced by flood bar 33 is preferably a minimum thickness equal to the screen thickness. Screen 30 is preferably spaced about $\frac{1}{16}$" from the upper surface of glass panel 20. During the adhesive application process, glass panel 20 is mounted on a suitable fixture 36, such as through the use of vacuum.

As squeegee 34 is moved across screen 30, it pushes screen 30 against glass panel 20 with line contact as shown in FIG. 5. This squeezes adhesive 22 through apertures 32 leaving a grid pattern of adhesive on glass panel 20 as shown in FIG. 6. This pattern of adhesive includes intersecting lines of adhesive 22a, 22b corresponding respectively to intersecting walls 14, 16 and a surrounding line of adhesive 22c for sealing around the outer periphery of glass panel 20 and a corresponding periphery upper frame portion 12. All lower surfaces of upper frame portion 12 are preferably molded with a mirror finish to facilitate uniform contact with adhesive 20. These lower surfaces may also be modified with a textured surface or other finish which increases surface area to enhance adhesive coverage.

Figure 7:
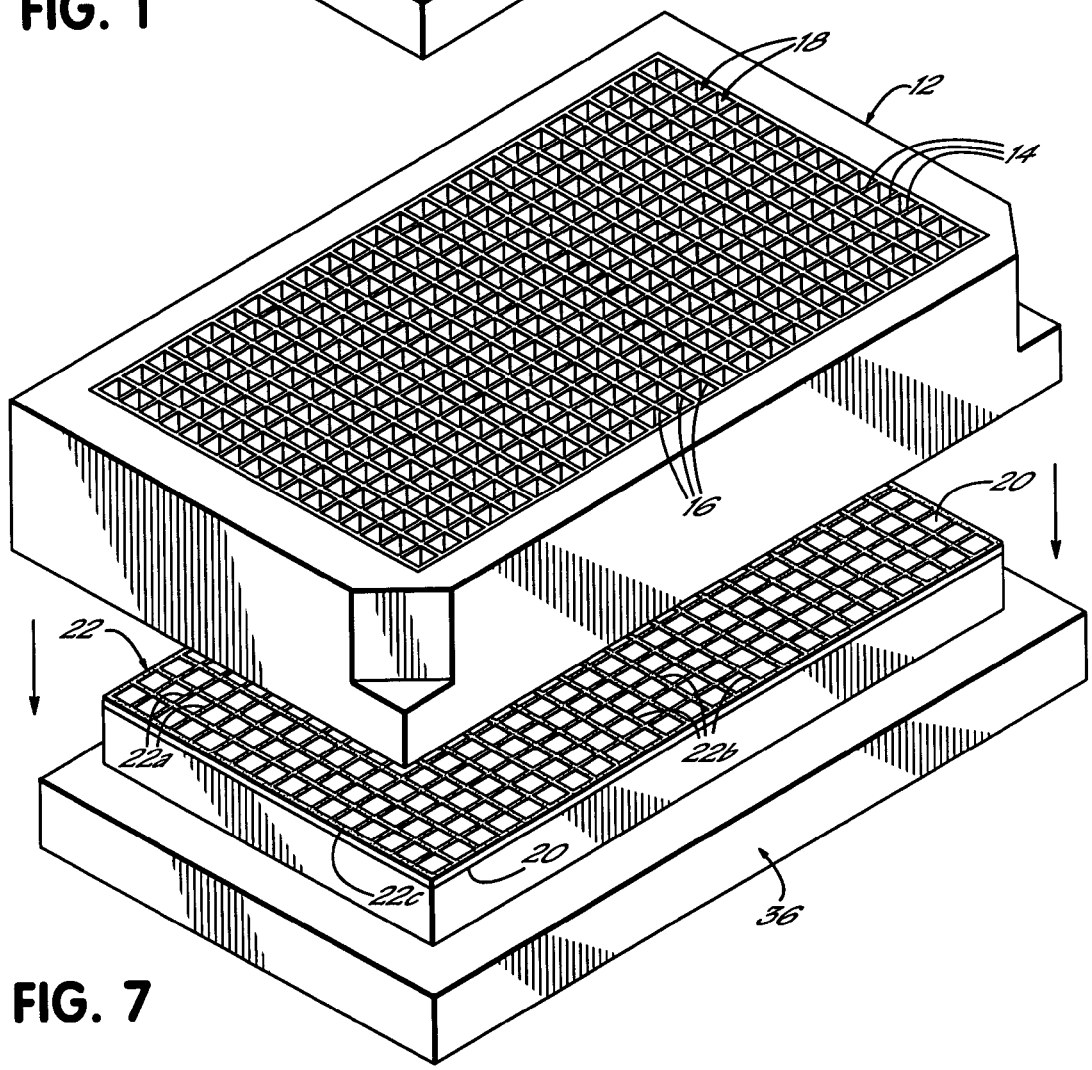
FIG. 7 is a schematic, perspective view showing the upper frame portion being applied to the glass panel having the adhesive applied thereto as shown in FIG. 6.

As further shown in FIG. 7, upper frame portion 12 is applied to glass panel 20 while ensuring that the lower ends of intersecting walls 14, 16 are precisely aligned with the intersecting lines of adhesive 22a, 22b, 22c. Ultraviolet and visible light is then directed at the adhesive through glass panel 20 to cure adhesive lines 22a, 22b, 22c. The cure is performed using an electrode or electrode-less lamp, such as a xenon lamp or a mercury vapor lamp. The lamp preferably provides light in both the visible and UV spectrums, i.e., in wavelengths ranging from 200 nm to 1,000 nm. The lamp is used in a power range of 500 to 1,000 watts, but this power may range from 200 to 2,000 watts. Depending on the power setting, the light is activated for a time ranging from about 2 seconds to about 30 seconds.

While the present invention has been illustrated by a detailed description of a preferred embodiment, it is not the intention of the applicants to restrict or in any way limit the scope of the appended claims to such detail. Various features of the invention may be combined in various unique and advantageous manners to achieve objectives of the invention. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method of making a multi-well test plate for assaying liquid samples including a transparent panel and an upper frame portion with a plurality of walls defining adjacent wells arranged in a grid pattern, the method comprising:
    placing the transparent panel and the upper frame portion in a positional relationship with a layer of a light-curable adhesive disposed therebetween in a configuration corresponding to the grid pattern and in a thickness ranging from about 0.0005" to about 0.005"; and
    curing the light-curable adhesive with light to adhesively bond the upper frame portion and the transparent panel.

2. The method of claim 1 further comprising:
    applying the layer of the light-curable adhesive in the configuration to the transparent panel.

3. The method of claim 2 wherein applying the layer of the light-curable adhesive further comprises:
    applying the layer of the light-curable adhesive by a silk-screening process to the transparent panel.

4. The method of claim 2 wherein applying the layer of the light-curable adhesive further comprises:
    applying the layer of the light-curable adhesive such that the wells are free of the light curable adhesive.

5. The method of claim 4 wherein the configuration includes a plurality of intersecting adhesive lines, and applying the layer of the light-curable adhesive further comprises:
    limiting a width of each of the intersecting adhesive lines such that, when the upper frame portion is contacted with the transparent panel, adhesive from the intersecting adhesive lines does not enter the wells.

6. The method of claim 2 further comprising:
    aligning the plurality of walls with the configuration of adhesive before the transparent panel and the upper frame portion are placed in a contacting relationship.

7. The method of claim 1 wherein the transparent panel is formed from glass and the upper frame portion is formed from a transparent polymer.

8. The method of claim 1 wherein the transparent panel and the upper frame portion are each formed from a transparent polymer.

9. The method of claim 1 wherein curing the light-curable adhesive further comprises:
    exposing the light-curable adhesive to ultraviolet light.

10. The method of claim 9 wherein exposing the light-curable adhesive further comprises:
    directing ultraviolet light through the transparent panel.

11. The method of claim 9 wherein curing the light-curable adhesive further comprises:
    exposing the light-curable adhesive to visible light.

12. The method of claim 1 wherein exposing the light-curable adhesive further comprises:
    directing visible light and ultraviolet light through the transparent panel to illuminate the light-curable adhesive.

13. The method of claim 1 wherein curing the light-curable adhesive further comprises:
    exposing the light-curable adhesive to visible light.

14. The method of claim 13 wherein curing the light-curable adhesive further comprises:
    directing visible light through the transparent panel to illuminate the light-curable adhesive.

15. The method of claim 1 further comprising:
    sterilizing the adhesively-bonded upper frame portion and transparent panel, after curing, utilizing at least one of ethylene oxide and gamma radiation.

16. The method of claim 1 further comprising:
    molding lower surfaces of the upper frame portion wetted by the layer of the light-curable adhesive with a mirror finish.

17. The method of claim 1 further comprising:
    modifying lower surfaces of the upper frame portion with a finish that increases surface area.

18. A method of making a multi-well test plate for assaying liquid samples including a transparent panel and an upper frame portion with a plurality of walls defining adjacent wells and having upper and lower ends, the method comprising:
    mounting the transparent panel with an upper surface disposed adjacent a screen having apertures in a configuration corresponding to the lower ends of the walls;
    spreading a generally even layer of light curable adhesive on a surface of the screen opposite to the transparent panel;
    wiping the adhesive from the screen to urge portions thereof through the apertures and onto the upper surface of the transparent panel in the configuration and in a thickness ranging from about 0.0005" to about 0.005";
    aligning the configuration of adhesive with the configuration of the lower ends of the walls;
    mounting the transparent panel to the upper frame portion while maintaining the alignment of the adhesive and the walls; and
    curing the adhesive by directing light through a bottom side of the transparent panel.

19. The method of claim 18 wherein curing the light-curable adhesive further comprises:
    directing ultraviolet light through the transparent panel to illuminate the light-curable adhesive.

20. The method of claim 19 wherein curing the light-curable adhesive further comprises:
    directing visible light through the transparent panel to illuminate the light-curable adhesive.

21. The method of claim 1 wherein the upper frame portion includes a plurality of 384 wells arranged in the grid pattern.

22. The method of claim 1 wherein the upper frame portion is permanently attached to the panel by the layer of the light-curable adhesive.

23. The method of claim 1 wherein the layer of the light-curable adhesive provides a permanent seal between the upper frame portion and the panel.

24. The method of claim 2 wherein the light-curable adhesive is thixotropic with a viscosity greater than about 8,000 centipoise.

25. The method of claim 1 wherein curing the light-curable adhesive with light further comprises:
    providing light in a power range of 500 watts to 1,000 watts to cure the light curable adhesive.

26. The method of claim 1 wherein the thickness of the layer of the light-curable adhesive ranges from about 0.002" to about 0.004".

27. The method of claim 1 wherein the light-curable adhesive is non-autofluorescent.

* * * * *